United States Patent [19]

Komoto

[11] Patent Number: 4,885,682

[45] Date of Patent: Dec. 5, 1989

[54] MICROPROGRAM CONTROLLER FOR DETECTING THE OCCURRENCE OF AN INTERRUPT REQUEST OR A TERMINATION OF A STRING INSTRUCTION

[75] Inventor: Yasuhiko Komoto, Tokyo, Japan

[73] Assignee: NEC Corporation, Tokyo, Japan

[21] Appl. No.: 127,493

[22] Filed: Dec. 1, 1987

[30] Foreign Application Priority Data

Dec. 1, 1986 [JP] Japan .................... 61-286936

[51] Int. Cl.[4] .............................................. G06F 9/30
[52] U.S. Cl. .............................. 364/200; 364/261.5; 364/262.1; 364/263.2
[58] Field of Search ... 364/200 MS File, 900 MS File

[56] References Cited

U.S. PATENT DOCUMENTS

| | | | |
|---|---|---|---|
| 4,338,662 | 7/1982 | Yokoyama | 364/200 |
| 4,398,244 | 8/1983 | Chu et al. | 364/200 |
| 4,429,361 | 1/1984 | Maccianti et al. | 364/200 |
| 4,661,925 | 4/1987 | Miu et al. | 364/200 |
| 4,719,565 | 1/1988 | Moller | 364/200 |

Primary Examiner—Eddie P. Chan
Attorney, Agent, or Firm—Foley & Lardner, Schwartz, Jeffery, Schwaab, Mack, Blumenthal & Evans

[57] ABSTRACT

A microprogram controller receives an interrupt request signal during execution of a STRING instruction for transferring a character-string or a bit string. In the execution of the STRING instruction, a data transmission operation for transferring one unit of the character-string or bit-string is repeated a predetermined number of times, and an instruction end signal is produced after data transfer. The interrupt request signal and the instruction end signal are supplied to an OR gate. By executing a compound conditional branch instruction, the output level of the OR gate is judged. If the output of the OR gate takes an active level, interrupt processing or STRING instruction end processing is executed.

10 Claims, 4 Drawing Sheets

MICROPROGRAM CONTROLLER FOR DETECTING THE OCCURRENCE OF AN INTERRUPT REQUEST OR A TERMINATION OF A STRING INSTRUCTION

BACKGROUND OF THE INVENTION

The present invention relates to a microprocessor in an information processing system and more particularly to a microprogram control type central processing unit (called hereinafter "microprogram controller).

In a microprogram controller, instructions programmed by a user are stored into a program memory as microinstructions. Each macroinstruction has address information designating a starting address of a sequence of microinstructions for executing the macroinstruction. The sequence of microinstructions for the respective macroinstructions are stored into a microinstruction memory. When a macroinstruction is read from the program memory, the sequence of microinstructions for that macroinstruction are read from the microinstruction memory. The controller executes the sequence of microinstructions. Thus, the macroinstruction is executed.

In general, when an interrupt request occurs during instruction execution, interrupt processing is not carried out immediately but is one after the instruction variation. In other words, the sequence of microinstructions for each macroinstruction include an interrupt conditional branch instruction at the end thereof. However, in cases where an instruction execution time is long such as a STRING instruction for transferring a character-string or a bit-string, it is preferable for real-time processing to receive an interrupt request during the instruction execution. In the execution of the STRING instruction, a loop of microinstructions for transferring one data unit of the character-string or bit-string is repeated a number of times determined by the length of the character-string or bit-string. Accordingly, the interrupt conditional branch instruction is inserted into the loop of microinstructions. When the transmission of one data unit is executed a predetermined number of times, an end signal is produced to complete the execution of the STRING instruction. Accordingly, the loop of microinstructions further requires another conditional branch instruction for judging whether or not the data transmission end signal is produced.

Thus, an interrupt request can be received during the execution of the STRING instruction. However, the loop of microinstructions includes two conditional branch instructions. Namely, the conditional branch instruction is executed twice every time one data unit of the character-string or bit-string is transferred. As a result, the execution time of the STRING instruction is undesirably prolonged.

SUMMARY OF THE INVENTION

Therefore, an object of the present invention is to provide a microprocessor which receives an interrupt request during instruction execution without prolonging instruction execution time.

Another object of the present invention is to provide a microprogram controller which can receive an interrupt request signal supplied temporarily during execution of an instruction.

A processor according to the present invention comprises storing means for storing a sequence of microinstructions for each macroinstruction, means responsive to a macroinstruction to be executed for reading an associated sequence of microinstructions from the storing means, means for executing the sequence of microinstructions read from the storing means, an OR gate supplied with an interrupt request signal and an instruction end signal, means for detecting a level of an output of the OR gate. When the microinstruction read from the storing means includes compound conditional branch instruction information and for outputting a detection signal when the output of the OR circuit takes an active level, and means responsive to the detection signal for designating a branch address of the storing means in order to read a microinstruction stored at the branch address.

Accordingly, in the execution of a STRING instruction, two conditional branch instructions are not required in a loop of microinstructions for transferring one data unit of a character-string or a bit-string. Only a compound conditional branch instruction is provided in the loop of microinstructions. When the compound conditional branch instruction is read from the storing means and then executed, the output level of the OR gate is detected. When both of the interrupt request signal and the instruction end signal are not produced, the output of the OR gate takes an inactive level. The detection signal is thus not produced. The transmission of one data unit of the character-string or bit-string is thereby repeated. When at least one of the interrupt request signal and the instruction end signal is produced, the detection signal is produced by the execution of the compound conditional branch instruction. The branch address is thereby designated and branch processing is executed. In branch processing, an instruction for judging which of either the interrupt request signal or the instruction end signal is supplied is executed at first. If it is judged that the interrupt request signal is supplied, the content of a program counter designating an address of a program memory storing macroinstructions and the content of a program status word are saved into saving areas, and interrupt processing is then executed. In cases of judging that the instruction end signal is supplied, a macroprogram next to the STRING instruction is read from the program memory, and a sequence of microinstructions for the next macroprogram are executed. Thus, the processor according to the present invention can receive an interrupt request during execution of the STRING instruction without prolonging the execution time of the STRING instruction.

The interrupt request signal is frequently supplied temporarily, and in that case it may disappear before the branch processing. An error operation of the processor thereby occurs. In order to overcome this drawback, a processor according to another aspect of the present invention further comprises means for latching an interrupt request signal. Even if the interrupt request signal disappears before the branch processing, therefore, it is judged that the branch condition is caused by the interrupt request. An error operation of the processor thereby does not occur.

BRIEF DESCRIPTION OF THE DRAWINGS

The above and other objects, advantages and features of the present invention will be more apparent from the following description taken in conjunction with the accompanying drawings, in which.

DETAILED DESCRIPTION OF THE PREFERRED EMBODIMENTS

Figure 1:
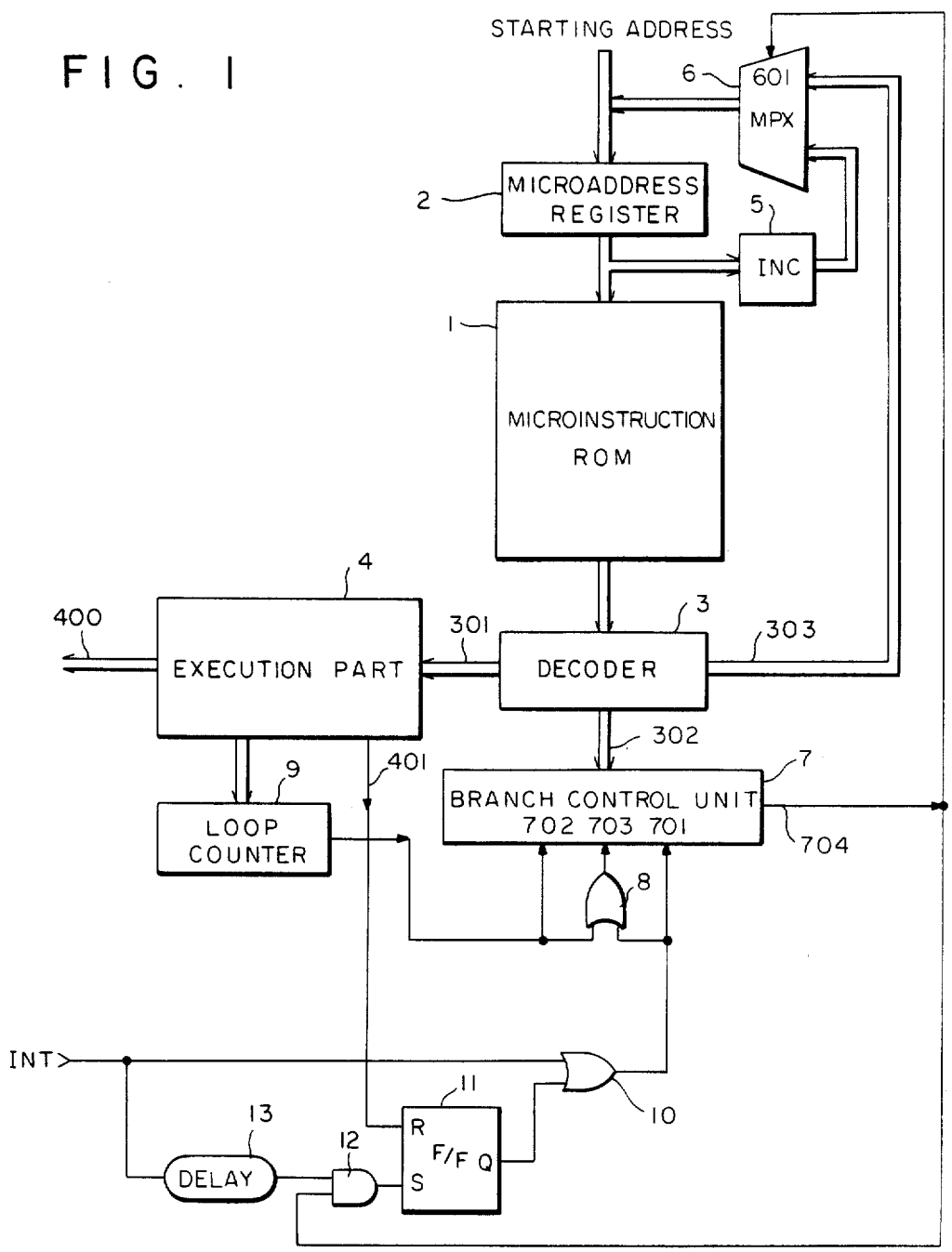
FIG. 1 is a block diagram showing an embodiment of the present invention.

Referring to FIG. 1, a microprogram controller according to an embodiment of the present invention includes a microinstruction ROM (Read Only Memory) 1 which stores a sequence of microinstructions for each of a plurality of macroinstructions which are in turn stored into a program ROM (not shown) and programmed by a user. Each of the macroinstructions includes address information designating a starting address of the associated sequence of microinstructions. Accordingly, the address information of the macroinstruction to be executed is supplied to a microaddress register 2 as a starting address. Thus, a starting microinstruction of the sequence of microinstructions for the macroinstruction to be executed is read out and supplied to a decoder 3. The decoder 3 decodes the read-out microinstruction and produces data and/or control signals 301 which are in turn supplied to an execution part 4 including an arithmetic and logic unit (not shown) to execute an arithmetic and/or logic operation and to control a data memory and various I/O units (all not shown) via an internal bus 400. The decoder 3 further produces branch address information 303 and branch control signals 302 when the microinstruction read from the ROM 1 is a branch instruction. The branch address information 303 is supplied to a first set of input terminals of a multiplexer 6, a second set of input terminals of which is supplied with address information obtained by incrementing the content of the microaddress register 2 by one by an incrementer 5. The multiplexer 6 selects the address information from the decoder 3 when a control signal supplied to a control terminal 601 thereof takes a high level and that from the incrementer 5 when the control signal takes the low level, thereby supplying the selected address information to the microaddress register 2. The branch control signals 302 from the decoder 3 are supplied to a branch control unit 7. When the decoder 3 decodes an unconditional branch instruction, the branch control unit 7 produces a high level output 704 without judging levels of input terminals 701 to 703 thereof, the high level output 704 being in turn supplied to the multiplexer at terminal 60 as the control signal. On the other hand, in cases where a conditional branch instruction is decoded, the branch control unit 7 judges the level at either one of the terminals 701 to 703 in accordance with the content of the conditional branch instruction, and then produces the high level output 704 when the judged terminal 701, 702 or 703 takes an active level. In this embodiment, an interrupt request signal INT is supplied to the first terminal 701 of the unit 7 via an OR gate 10. As described hereinbefore, in the execution of a STRING instruction for transferring a character-string or a bit-string, a loop of microinstructions for transferring one data unit of the character-string or bit-string is repeated a predetermined number of times. This number of times is stored into a loop counter 9 which in turn decrements the value stored therein by one each time one data unit of the character-string or bit-string is transferred. The counter 9 produces a high level output as a STRING instruction end signal when the value becomes zero. The output of the loop counter 9 is supplied to the second terminal 702 of the unit 7.

In order to receive an interrupt request during the execution of the STRING instruction without prolonging the execution time thereof, an OR gate 8 is provided and a compound conditional branch instruction is provided in the microinstruction ROM 1 in accordance with the present invention. The OR gate 8 is supplied with the interrupt request signal INT at one input terminal and the output signal of the loop counter 9 at its other input terminal, and the output terminal of the OR gate 8 is connected to the third terminal 703 of the unit 7. The compound conditional branch instruction is used to detect the level of the terminal 703, i.e. the output level of the OR gate 8.

Detailed description of an execution operation of the STRING instruction will be made below with reference to FIG. 2. When the STRING instruction is read out as a macroinstruction to be executed, a starting address of a sequence of microinstructions for the STRING instruction is set into the microaddress register 2, whereby the sequence of microinstructions starts to be read from the microinstruction ROM 1. By executing several microinstructions in the sequence of microinstructions, a preoperation of the STRING instruction is carried out, as shown by a step 100 in FIG. 2. In the preoperation of the STRING instruction, designation of a starting address of the character-string or bit-string to be transferred, designation of a destination address, an arithmetic operation for obtaining the number of unit data transferring times, etc. are executed by the execution part 4 under the control of the decoder 3. A next microinstruction is thereafter read from the ROM 1 and executed by the execution part 4 to store into the loop counter 9 a count value representative of the number of unit data transferring times, as shown by a step 101 in FIG. 2. Subsequently, the compound conditional branch instruction (called hereinafter "JSTRT instruction") is read from the microinstruction ROM 1 in accordance with the present invention. As a result of decoding the JSTRT instruction, the decoder 3 produces branch address information 303 and prompts the branch control unit 7 to judge the input level of the third terminal 703, i.e. the output level of the OR gate 8, by the control signals 302. When both the interrupt request signal INT and the high level output of the loop counter 9 are not supplied, i.e. when an interrupt request does not occur and the content of the loop counter 9 is not zero, the output of the OR gate 8 takes the low level (inactive level). The low level control signal 704 is thereby produced from the unit 7, so that the multiplexer 6 selects and supplies the address information from the incrementer 5 to the microaddress register 2. Thus, an address next to the address at which the JSTRT instruction is stored is designated. The microinstruction stored in the designated address has data transmission information. Accordingly, one data unit of the character-string or bit-string is transferred to the destination address by the execution part 4, as shown by a step 103 in FIG. 2. As the result of data transmission, the execution part 4 increments the address of the character-string or bit-string to be transferred by one and the loop counter 9 decrements the count value stored therein by one. If desired, the steps 102 and 103 shown in FIG. 2 may be interchanged. An unconditional branch instruction is executed as a next microinstruction. Accordingly, the decoder 3 produces the branch address information 303 designating the address at which the JSTRT instruction is stored and the branch control unit 7 produces the high level output signal 704. The microaddress register 2 is thereby stored with the address at which the JSTRT instruction is stored. Thus, unit data of the character-string or bit-string is transferred one by one.

When an interrupt request occurs and/or the content of the loop counter 9 becomes zero, the branch control unit 7 detects the high level (active level) of the output of the OR gate 8 by the execution of the JSTRT instruction and produces the high level signal 704 which is in turn supplied to the multiplexer 6. The branch address information from the decoder 3 is thereby supplied to the microaddress register 2. Thus, branch processing is executed.

In branch processing, an interrupt conditional branch instruction (called hereinafter "JINTR instruction") or a zero conditional branch instruction (called hereinafter "JZLC instruction") is executed at first. In this embodiment, the JINTR instruction is executed as represented by a step 104 in FIG. 2. Accordingly, the branch control unit 7 detects the level at the first terminal 701. If the interrupt request signal INT is supplied, the level at the first terminal 701 takes the high level. Therefore, the unit 7 supplies the high level signal 704 to the multiplexer 6, so that second branch address information from the decoder 3 is supplied to the microaddress register 2. An interrupt enable operation is thus executed as shown by a step 105 in FIG. 2. In the interrupt enable operation, the saving of the contents of a program counter and a program status word (all not shown), the reading of a macroinstruction designated by a starting address for interrupt processing, and the setting of a starting address of a sequence of microinstructions for the macroinstruction to be executed are carried out by use of the execution part 4. When the interrupt processing is completed, the STRING instruction is executed again to transfer the remaining data of the character-string or bit-string. On the other hand, when the first terminal 701 takes the low level, the branch control unit 7 produces the low level output 704. This means that the content of the loop counter 9 becomes zero. Accordingly, the address information from the incrementer 5 is supplied to the microprogram register 2 and a STRING instruction end operation is executed as represented by a step 106 in FIG. 2. In this operation, the content of a program counter (not shown) is incremented by one to read a next macroinstruction and a starting address of a sequence of microinstructions for executing the next macroinstruction is stored into the microaddress register 2 under the control of the execution unit 4.

Figure 2:
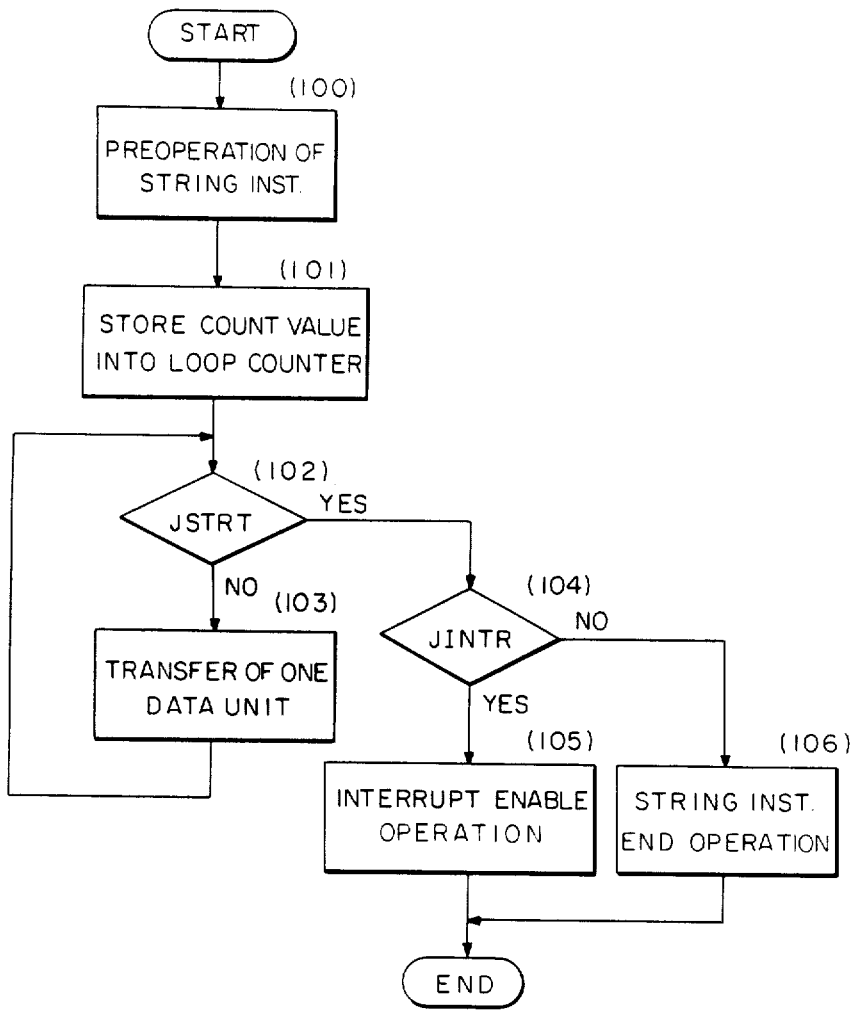
FIG. 2 is a flow chart representing an operation of a controller shown in FIG. 1.

In a case where the JZLC instruction is executed at first in the branch processing, the step 104 shown in FIG. 2 is replace by the JZLC instruction and the steps 105 and 106 are executed when the second terminal 702 takes the low level and the high level respectively.

Since only one conditional branch instruction (i.e. JSTRT instruction) is executed during the data transmission, the execution time of the STRING instruction is not prolonged. When an interrupt request occurs during the execution of the STRING instruction, interrupt processing is executed without waiting for the end of the STRING struction.

The interrupt request signal INT is frequency supplied temporarily. In this case, the temporary interrupt request signal INT may disappear before the execution of the JINTR instruction in the branch processing, so that the step 106 shown in FIG. 2 is carried out to complete the STRING instruction. An error operation thereby occurs.

In order to overcome this drawback, an OR gate 10, an S-R type flip-flop circuit (called hereinafter "F/F circuit") 11, an AND gate 12 and a delay circuit 13 are provided in accordance with the present invention. The OR gate 10 is supplied with the temporary interrupt request signal INT and a Q-output of the F/F circuit 11, and the output terminal thereof is connected to the terminal 701 of the unit 7 and to the input of the OR gate 8. The temporary interrupt signal INT is further supplied via the delay circuit 13 to one terminal of the AND gate 12, the other input terminal of which is supplied with the output signal 704 of the branch control unit 7. The output of the AND gate 12 is connected to a set terminal S of the F/F circuit 11, a reset terminal R of which is supplied with a reset signal 401 from the execution part 4. The delay circuit 13 delays the temporary interrupt signal INT by a delay time that is equal approximately to a time period from a time point at which the JSTRT instruction is executed to a time point at which the branch control unit 7 provides the high level output 704. Accordingly, when the high level output 704 is produced by the execution of the JSTRT instruction, the AND gate produces the high level output to set the F/F circuit 11, the Q-output of which is thereby changed to and held at the high level. Namely, the temporary interrupt request signal INT is held by the F/F circuit 11. Accordingly, when the JINTR instruction is executed in the branch processing, the high level at the first terminal 701 of the unit 7 is detected, so that the interrupt enable operation is executed. No error operation occurs. In the interrupt enable operation, the execution part 4 produces a reset signal 401 to reset the F/F circuit 11. The Q-output is thereby changed to the low level. On the other hand, in cases where the high level output 704 is produced as a result of a fact that the content of the loop counter 9 becomes zero, the F/F circuit 11 is not set. The STRING instruction end operation is thereby executed.

Figure 3:
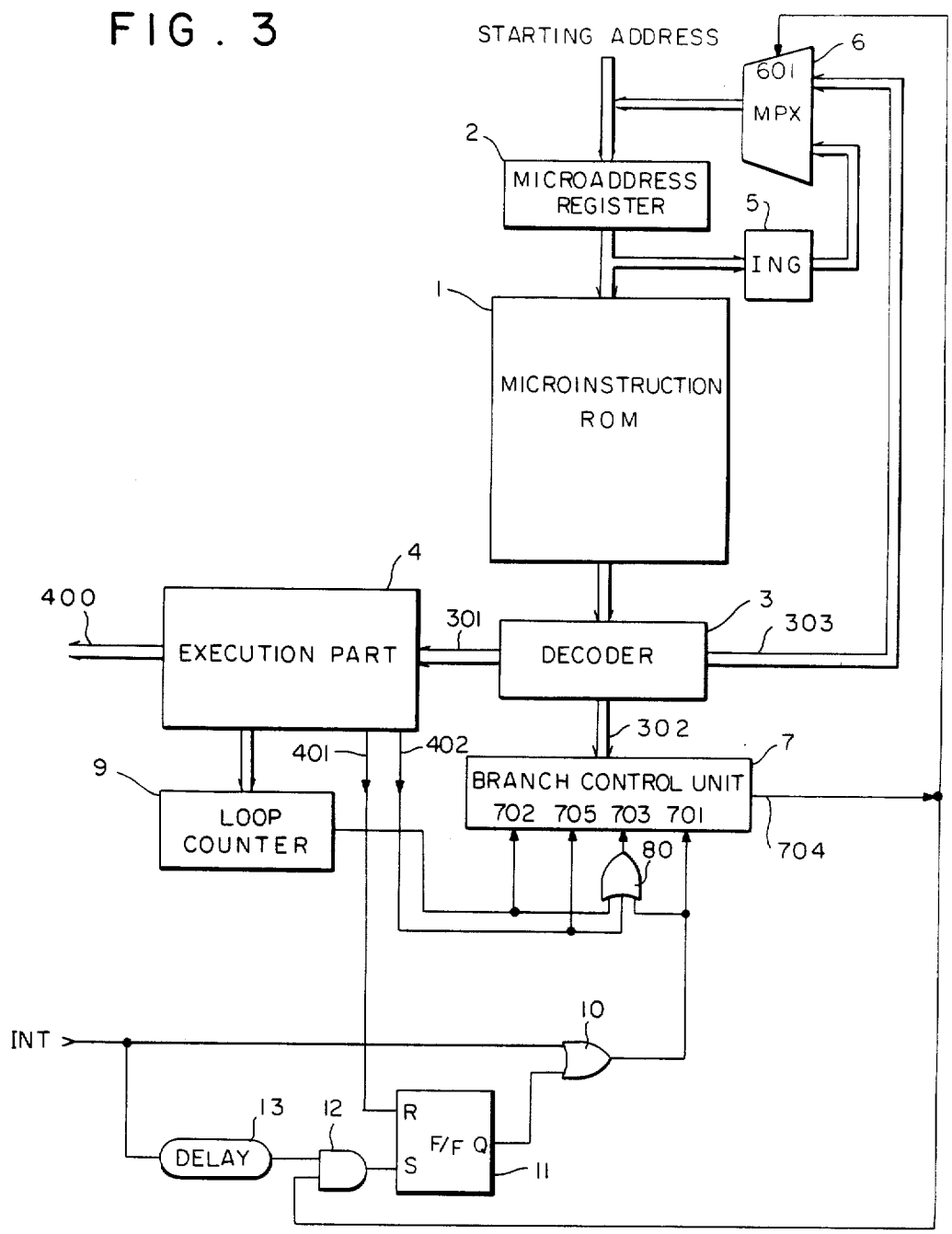
FIG. 3 is a block diagram showing another embodiment of the present invention.

When the address of unit data to be transferred and/or the destination address exceeds a particular boundary of a memory scope, the STRING instruction is required to be completed. A construction for this purpose is shown in FIG. 3 as another embodiment of the present invention, in which the same constituents as those shown in FIG. 1 are denoted by the same reference numerals to not repeat the further description thereof. In FIG. 3, an OR gate 80 having three input terminals is employed, the first and second input terminals of which are supplied respectively with the interrupt request signal INT and the output of the loop counter 9 and the third input terminal of which is supplied with a control signal 402 from the execution part 4. The signal 402 is also supplied to a fourth input terminal 705 of the branch control unit 7. The execution unit 4 produces the high level signal 402 when the address of unit data to be transferred and/or the destination address exceeds the particular boundary of a memory location.

Figure 4:
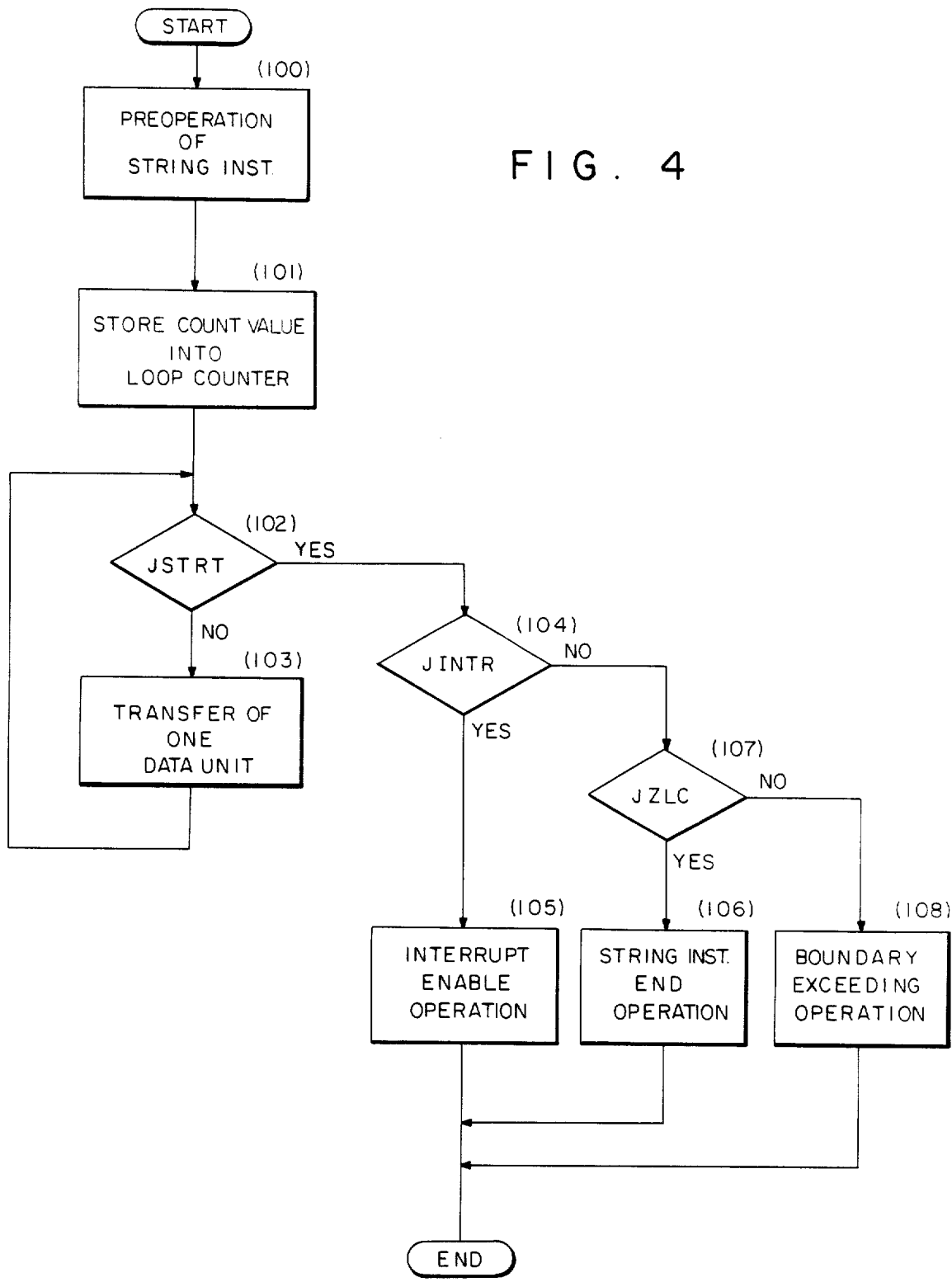
FIG. 4 is a flow chart representing an operation of a controller shown in FIG. 3.

A flow chart representing an operation of this processor is shown in FIG. 4. When any one of the interrupt request signal INT, the high level output of the loop counter 9 and the high level control signal 402 is supplied, the output of the OR gate 80 takes the high level, so that branch processing is executed after the execution of a JSTRT instruction. Assuming that the OR gate 80 takes the high level due to the fact that the high level control signal 402 is supplied thereto, the branch control unit 7 does not produce the high level output 704 even when the JINTR and JZLC instructions are executed. A boundary exceeding operation denoted by a step 108 in FIG. 4 is thus executed. In this operation, the execution of the STRING instruction is completed and a message representative of boundary-exceeding is executed. Also in this embodiment, a latch circuit comprising the F/F circuit 11, AND gate 12 and delay circuit 13 is provided to latch a temporary interrupt request signal INT.

The present invention is not limited to the above embodiments, but may be changed or modified without departing from the spirit and scope of the present invention.

What is claimed is:

1. A microprogram controller comprising:
   storing means for storing a plurality of series of microinstructions for executing respective macroinstructions, at least one series of said plurality of series of microinstructions including a chain of microinstructions to be executed repeatedly, said chain of microinstructions containing therein a compound conditional branch microinstruction,
   reading means, coupled to said storing means and responsive to a macroinstruction to be executed, for reading an associated series of microinstructions from said storing means,
   executing means coupled to said storing means for executing said associated series of microinstructions read from said storing means, said executing means including producing means for producing an execution end signal when an execution of said chain of microinstructions is repeated a predetermined number of times,
   an interrupt terminal supplied with an interrupt request signal,
   an OR gate, coupled to said producing means and to said interrupt terminal, producing an active level at an output node of said OR gate when at least one of said execution end signal and said interrupt request signal is supplied to said OR gate,
   said executing means further including detecting means, coupled to said OR gate and responsive to said compound conditional branch microinstruction, for detecting a level of said output node of said OR gate and for outputting a detection signal when said OR gate produces said active level, and generating means responsive to said compound conditional branch microinstruction for generating a branch address, and
   means, coupled to said detecting means and to said generating means and responsive to said detection signal, for supplying said branch address to said storing means to enable a microinstruction stored at said branch address of said storing means to be read.

2. A microprogram controller as claimed in claim 1, wherein said microinstruction stored at said branch address is an interrupt conditional branch microinstruction and said executing means further includes means, coupled to said interrupt terminal and responsive to said interrupt conditional branch microinstruction, for detecting whether or not said interrupt terminal is supplied with said interrupt request signal.

3. A microprogram controller as claimed in claim 1, wherein said microinstruction stored at said branch address is an execution end conditional branch microinstruction and said executing means further includes means, coupled to said producing means, for detecting whether or not said producing means produces said execution end signal.

4. A processor comprising:
   memory means for storing a first series of instructions including a conditional branch instruction and a second series of instructions,
   reading means for reading said first series of instructions from said memory means,
   executing means for executing said first series of instructions,
   producing means coupled to said executing means for producing a control signal when said executing means executes said first series of instructions a predetermined number of times,
   a terminal supplied with an interrupt request signal,
   an OR gate, coupled to said producing means and to said terminal, for receiving said control signal and said interrupt request signal,
   said executing means including judging means, coupled to said OR gate and responsive to said conditional branch instruction, for judging a level of an output of said OR gate and for outputting a branch signal when said output of said OR gate takes an active level,
   address producing means, responsive to said conditional branch instruction, for producing branch address information, and
   supply means, responsive to said branch signal, for supplying said branch address information to said memory means to enable said second series of instructions to be read from said memory means so that said executing means executes said second series of instructions.

5. A processor as claimed in claim 4, further comprising latching means, coupled between said terminal and said OR gate, for latching said interrupt request signal.

6. A processor as claimed in claim 5, wherein said latching means comprises a flip-flop circuit set by said interrupt request signal, said flip-flop circuit being reset by said executing means when said executing means executes said second series of instructions.

7. A microprocessor comprising:
   a microprogram memory storing a plurality of microinstructions including a series of microinstructions to be executed repeatedly, said series of microinstructions containing a compound conditional branch microinstruction,
   access means for accessing said microprogram memory and for reading a microinstruction from said microprogram memory,
   execution means, coupled to said microprogram memory, for executing a microinstruction read from said microprogram memory,
   counter means, coupled to said execution means, for counting execution of said series of microinstructions by said execution means and for producing an execution end signal when a count value of said counter means reaches a predetermined number,
   an interrupt terminal supplied with an interrupt request signal, latching means, coupled to said interrupt terminal, for latching said interrupt request signal as a latched interrupt request signal, a gate circuit having a first input node connected to said counter means to receive said execution end signal, a second input node and an output node, coupling means for coupling said latching means to said second input node to supply said latched interrupt request signal to said gate circuit, said gate circuit producing an active level at said output node when at least one of said execution end signal and said latched interrupt request signal is supplied to said gate circuit;

said execution means including branch control means, coupled to said output node and responsive to said compound conditional branch microinstruction, for detecting a level at said output node, and for producing a branch control signal when said gate circuit produces said active level and for generating branch address information, and branch access means, coupled to said branch control means and responsive to said branch control signal, for accessing an address of said microprogram memory designated by said branch address information so that said execution means executes a microinstruction read from an address of said microprogram memory designated by said branch address information.

8. A microprocessor as claimed in claim 7, wherein said latching means includes a flip-flop circuit and means for setting said flip-flop circuit in response to said interrupt request signal, and said coupling means includes an OR gate having a first input terminal connected to said interrupt terminal, a second input terminal connected to an output of said flip-flop circuit and an output terminal connected to said second input node.

9. A microprocessor as claimed in claim 7, wherein said microprocessor memory stores an interrupt-enable operation program and an instruction end operation program, and said execution means further includes means, responsive to said microinstruction read from said address of said microprogram memory designated by said branch address information, for detecting whether or not said latched interrupt request signal is supplied to said second input node, means for executing said interrupt-enable operation program when said latched interrupt request signal is detected to be supplied to said second input node and means for executing said instruction end operation program when said latched interrupt request signal is detected to be not supplied to said second input node.

10. A microprocessor as claimed in claim 7, wherein said microprogram memory stores an interrupt-enable operation program and an instruction end operation program, and said execution means further includes means, responsive to said microinstruction read from said address of said microprogram memory designated by said branch address information, for detecting whether or not said execution end signal is supplied to said first input node, means for executing said instruction end operation program when said execution end signal is detected to be supplied to said first input node and means for executing said interrupt-enable operation program when said execution end signal is detected to be not supplied to said first input node.

* * * * *